(12) United States Patent
Holder et al.

(10) Patent No.: US 9,104,481 B2
(45) Date of Patent: Aug. 11, 2015

(54) RESOURCE ALLOCATION BASED ON REVALIDATION AND INVALIDATION RATES

(71) Applicant: International Business Machines Corporation, Armonk, NY (US)

(72) Inventors: William A. Holder, Vestal, NY (US); Ronald C. Pierson, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 13/765,890

(22) Filed: Feb. 13, 2013

(65) Prior Publication Data

US 2014/0229937 A1    Aug. 14, 2014

(51) Int. Cl.
  G06F 9/455   (2006.01)
  G06F 9/46    (2006.01)
  G06F 21/00   (2013.01)
  G06F 9/50    (2006.01)

(52) U.S. Cl.
  CPC ........ G06F 9/50 (2013.01); *G06F 2009/45583* (2013.01)

(58) Field of Classification Search
  CPC .......................... G06F 9/50; G06F 2009/45583
  USPC ........................................... 718/1, 104; 711/6
  See application file for complete search history.

(56) References Cited

U.S. PATENT DOCUMENTS

| | | | |
|---|---|---|---|
| 7,571,286 B2* | 8/2009 | Fontenot et al. | 711/133 |
| 8,095,931 B1* | 1/2012 | Chen et al. | 718/104 |
| 8,364,640 B1* | 1/2013 | Beatty et al. | 707/640 |
| 8,387,049 B2* | 2/2013 | Adlung et al. | 718/100 |
| 2003/0212873 A1* | 11/2003 | Lee et al. | 711/170 |
| 2004/0143664 A1* | 7/2004 | Usa et al. | 709/226 |
| 2007/0156981 A1* | 7/2007 | Bitner et al. | 711/159 |
| 2009/0025006 A1* | 1/2009 | Waldspurger | 718/104 |
| 2010/0205395 A1 | 8/2010 | Srinivasan | |
| 2012/0210042 A1 | 8/2012 | Lim et al. | |
| 2014/0108764 A1* | 4/2014 | Li et al. | 711/171 |

OTHER PUBLICATIONS

Carl A. Waldspurger. "Memory Resource Management in VMware ESX Server". Proceeding of the fifth Symposium on Operating System Design and Implementation, Boston, Dec. 2002, pp. 181-194.*
Anastasi "A Bandwidth Reservation Protocol for Speech/Data Integration in TDMA-Based Advanced Mobile Systems", International Journal of Wireless Information Networks, vol. 3, No. 4, 1996; pp. 243-252.*
Schwidefsky, M., et al.; "Collaborative Memory Management in Hosted Linux Environments"; Proceedings of the Linux Symposium; vol. 2; p. 313-330; Jul. 19-22, 2006.

* cited by examiner

*Primary Examiner* — Emerson Puente
*Assistant Examiner* — Willy W Huaracha
(74) *Attorney, Agent, or Firm* — Cantor Colburn LLP; William A. Kinnaman, Jr.

(57) ABSTRACT

Embodiments of the invention relate to visiting, by a computing device comprising a processor, each guest of a plurality of guests, obtaining, by the computing device, a list of invalidation counts and revalidation counts associated with resources based on the visiting each guest, and calculating, by the computing device, a target size for invalidating resources for each guest based on the list of invalidation counts and revalidation counts.

17 Claims, 5 Drawing Sheets

RESOURCE ALLOCATION BASED ON REVALIDATION AND INVALIDATION RATES

BACKGROUND

The present invention relates to management of virtual machines (VMs), and more specifically, to a relative resource allocation among guests.

Service providers (e.g., cloud computing or virtual machine service providers) typically promote an availability of resources that exceeds a threshold value. When resources, such as storage or memory, are overcommitted (e.g., when the number or amount of resources requested exceeds actual resource availability), frames must be taken from guests in order to keep a supply of frames available for use by the system and other guests.

When taking or de-allocating frames from one or more guests, a determination may be made regarding how many frames to take from each guest. The determination may be based on an attempt to de-allocate frames from guests "fairly." One or more variables may be considered in the determination. For example, the relative sizes of the guests, the sizes of so-called "working sets" of the guests, the activity levels of the guests, and a demand for frames in a system may be taken into consideration.

SUMMARY

An embodiment is directed to a method for determining a resource allocation. The method comprises visiting, by a computing device comprising a processor, each guest of a plurality of guests. The method comprises obtaining, by the computing device, a list of invalidation counts and revalidation counts associated with resources based on the visiting each guest. The method comprises calculating, by the computing device, a target size for invalidating resources for each guest based on the list of invalidation counts and revalidation counts.

An embodiment is directed to an apparatus comprising at least one processing device and a storage device having instructions stored thereon. The instructions, when executed by the at least one processing device, cause the apparatus to visit each guest of a plurality of guests. The instructions, when executed by the at least one processing device, cause the apparatus to obtain a list of invalidation counts and revalidation counts associated with resources based on visiting each guest. The instructions, when executed by the at least one processing device, cause the apparatus to calculate a target size for invalidating resources for each guest based on the list of invalidation counts and revalidation counts.

An embodiment is directed to a computer program product comprising a computer readable storage medium having computer readable program code embodied therewith. The computer readable program code comprises computer readable program code configured for visiting each guest of a plurality of guests. The computer readable program code comprises computer readable program code configured for obtaining a list of invalidation counts and revalidation counts associated with resources based on visiting each guest. The computer readable program code comprises computer readable program code configured for calculating a target size for invalidating resources for each guest based on the list of invalidation counts and revalidation counts.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
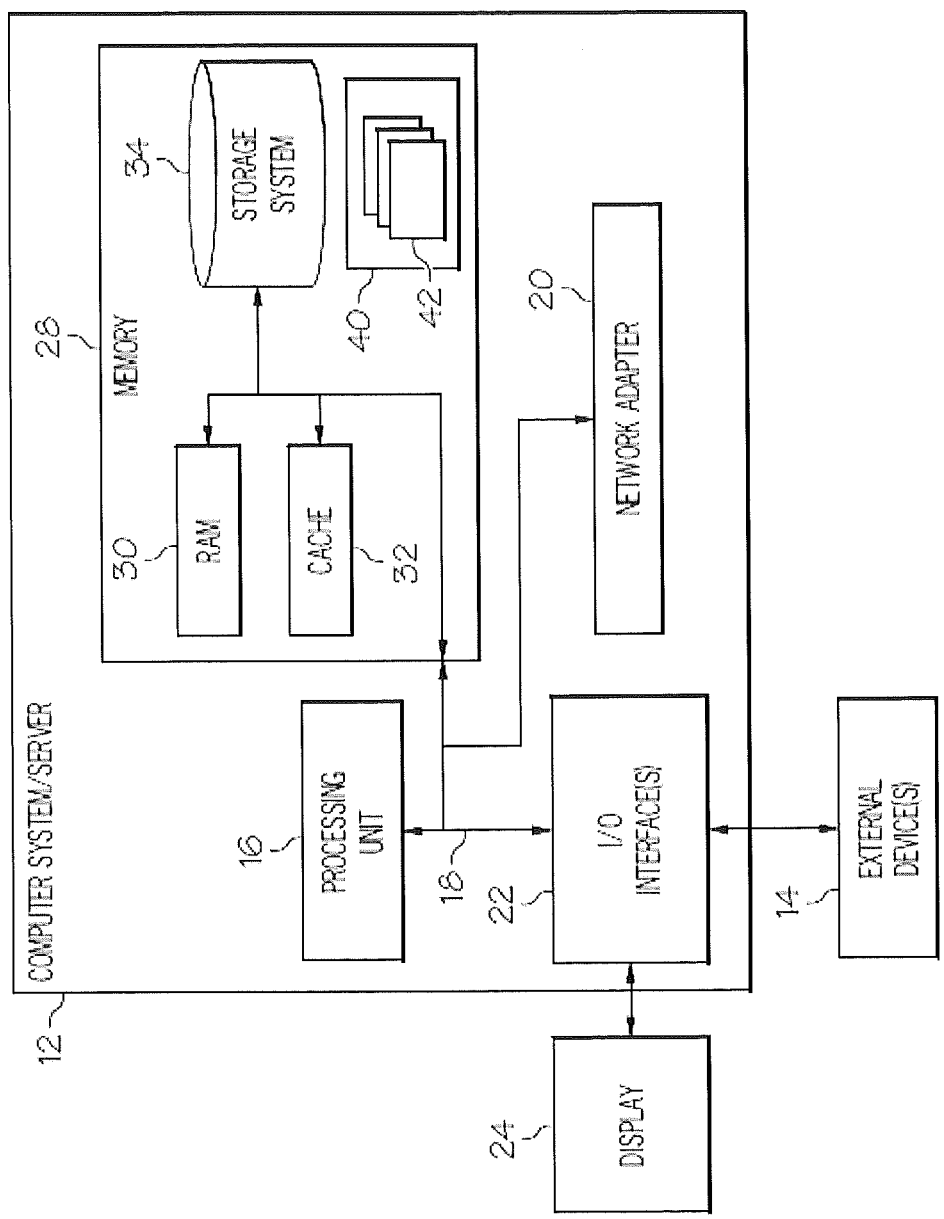
FIG. 1 depicts a cloud computing node according to an embodiment of the present invention.

Embodiments described herein are directed to one or more systems, apparatuses, and methods for allocating resources. In some embodiments, an individual guest's "target size" is established based on relative historical page revalidation and invalidation ratios for the guest with respect to system-wide historical page revalidation and invalidation ratios. As used herein, the term "target size" refers to the number or amount of resources that a guest should have. In some embodiments, the resources are specified in terms of one or more frames. As used herein, the term "invalidation" is a denotation or representation that a resource previously allocated to a guest has been taken from that guest for potential or actual use by another guest. As used herein, the term "revalidation" is a denotation or representation that a resource that is de-allocated from or taken from a guest is restored or re-allocated to that guest. One or more algorithms or formulas may be used to establish a target size for a guest, based on one or more factors, conditions, and/or rates.

Embodiments described herein include a bus designed to share information or data in an arrangement. In some embodiments, the arrangement takes the form of a hypervisor common contiguous memory region message bus configured to share the information as part of a cluster or work group. In some embodiments, the bus is implemented over a transport (e.g., a Transmission Control Protocol/Internet Protocol (TCP/IP) transport) or some other hardware mechanism. In some embodiments, a dedicated link (e.g., fiber cable) is used to enable a quick, secure transfer between two trusted or physically close machines, such as two peer machines. The link may be used to share information or data about common contiguous memory region replication, which may include metadata about a given contiguous memory region and how many times it is replicated on a given machine, with other machines in a work group or cluster.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
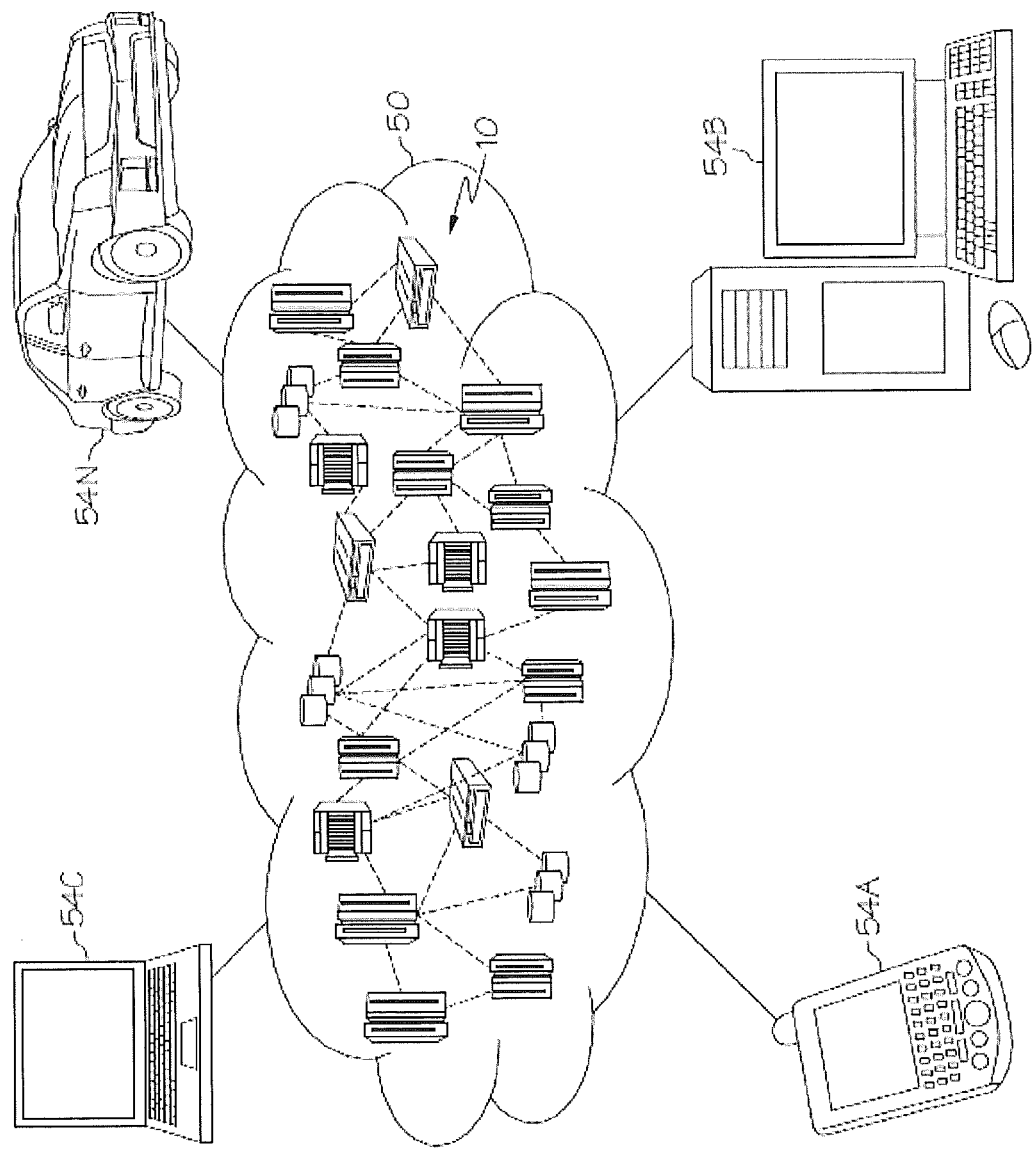
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
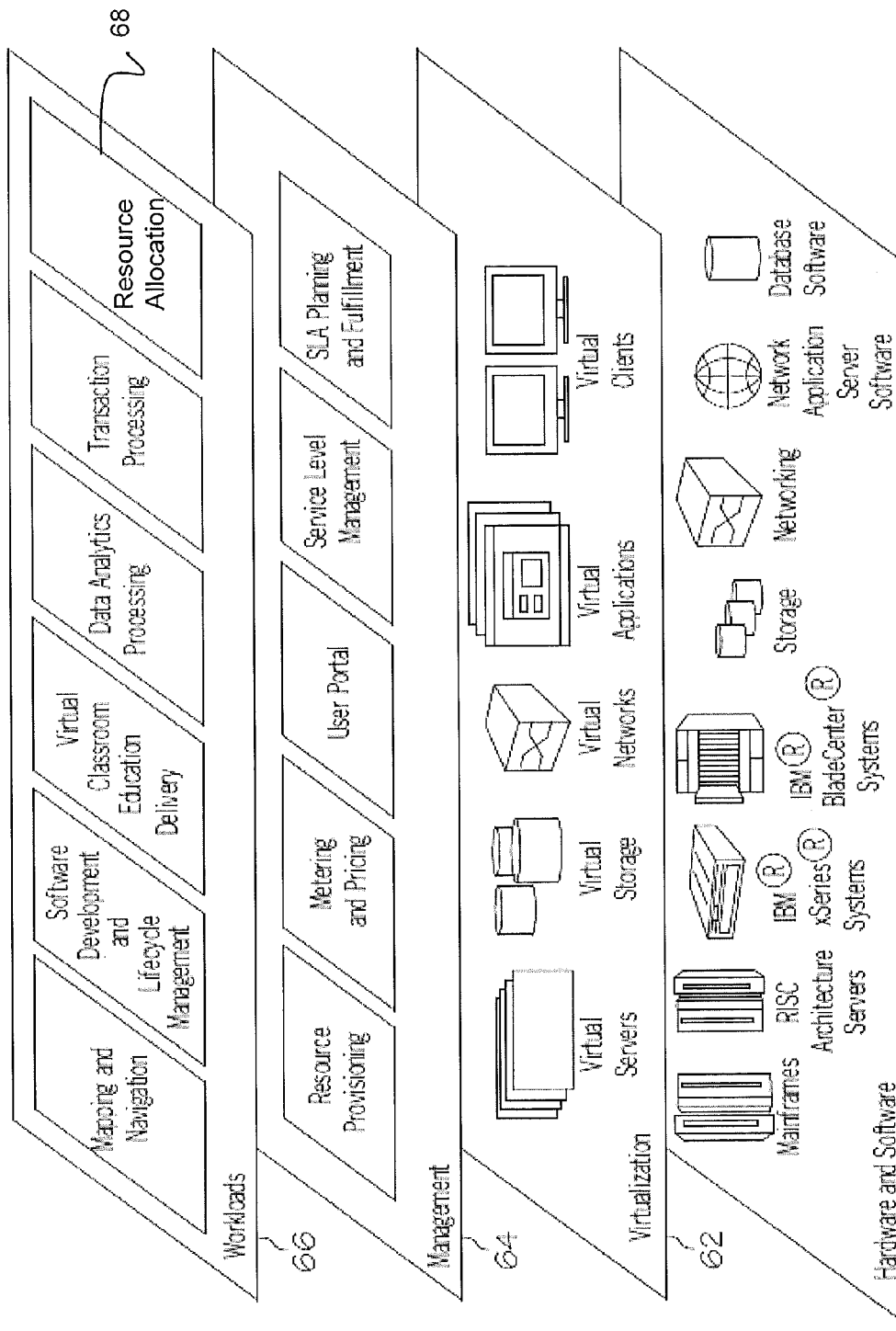
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and allocating resources. In some embodiments, a resource allocation module 68 may be used to allocate resources.

While the resource allocation module 68 is shown as being included in the workloads layer 66 in FIG. 3, the resource allocation module 68 may be included in one or more other layers in some embodiments. For example, the resource allocation module 68 may be included in the virtualization layer 62 in some embodiments.

In one embodiment, one or both of the hardware and software layer 60 and the virtualization layer 62 may include edge components, such as a web server front end and image cache, as well as an image library store, e.g., in a high-performance RAID storage area network (SAN). In an exemplary embodiment, an application, such as the resource allocation module 68, may implement a process or method for determining a target size for a guest or a virtual machine. In some embodiments, the resource allocation module 68 selects frames to de-allocate from a guest based on revalidation and invalidation parameters for the guest relative to system-wide revalidation and invalidation parameters.

Figure 4:
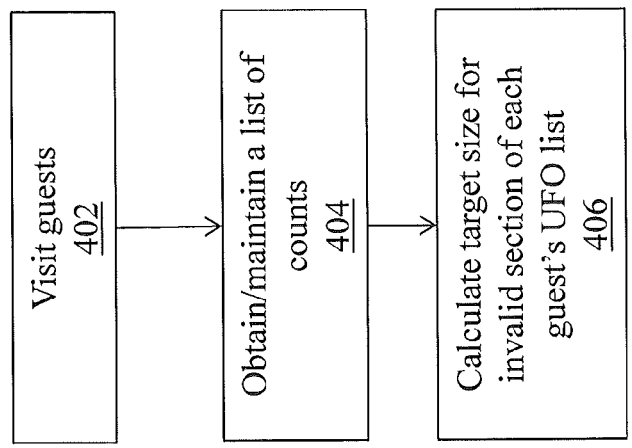
FIG. 4 illustrates a process flow for determining an allocation of resources in accordance with an embodiment.

Turning now to FIG. 4, a flow chart of an exemplary method 400 in accordance with one or more embodiments is shown. The method 400 may execute in connection with one or more systems, devices, or components, such as those described herein. In some embodiments, the method 400 may execute in connection with the resource allocation module 68 of FIG. 3. The method 400 may be used to determine a target size for a guest.

Figure 5:
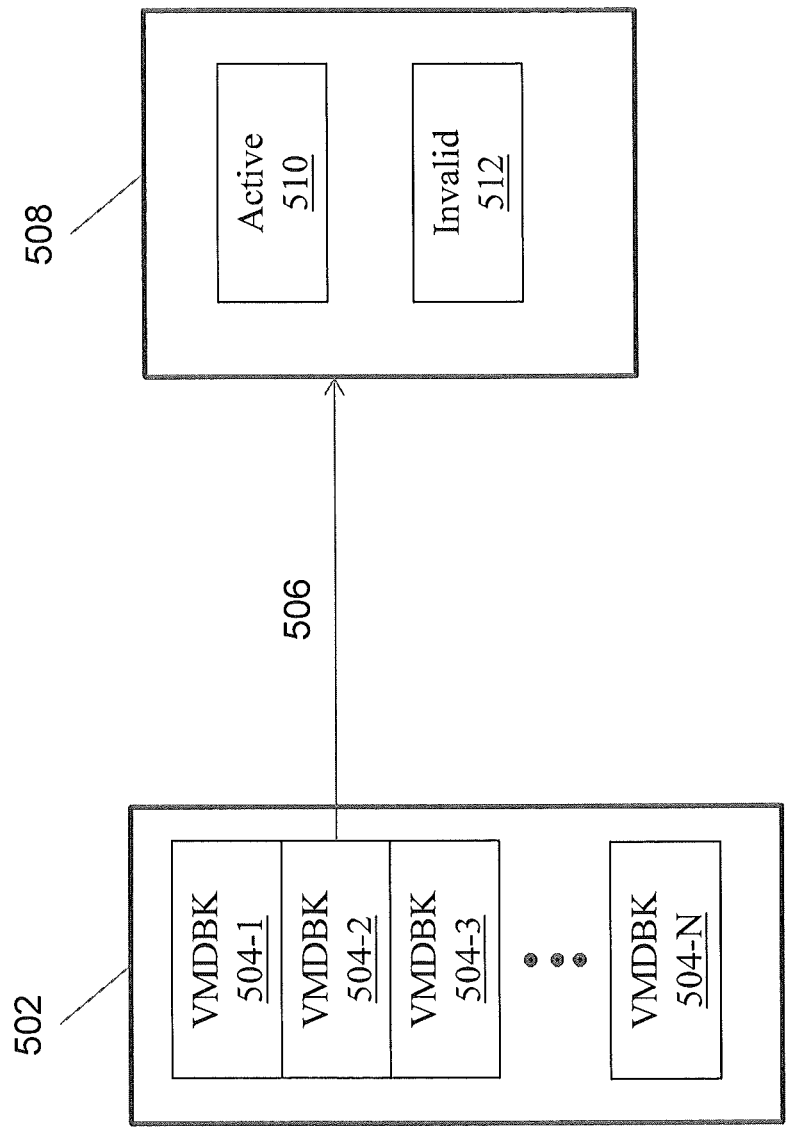
FIG. 5 illustrates a computing environment in accordance with an embodiment.

In block 402, each guest in a system or environment may be visited or accessed. As part of the visitation, resources allocated to each guest may be determined or examined. The visitation/access may occur in a "round robin" manner. Referring to FIG. 5, each guest may be found by traversing a global cyclic list 502 of virtual machine definition blocks (VMDBKs) 504 that represent the guests. As shown in FIG. 5, the list 502 may include a VMDBK for each of a number 'N' of guests in the system environment, such as VMDBK 504-1, VMDBK 504-2, VMDBK 504-3, ... VMDBK 504-N. Each "lap" of the list 502 may entail a visit to each guest once, as well as to a system VMDBK once.

Each VMDBK 504 may include a pointer to a structure called a user frames owned (UFO) list. For example, in FIG. 5, a pointer 506 is shown as being referenced from VMDBK 504-2 to a UFO list 508. The UFO list 508 may represent a linked list of data structures that each include one frame on the system that is currently "owned" or assigned to the guest associated with VMDBK 504-2. The UFO list 508 may include two sections: (1) an active section 510, and (2) an invalid section 512. The active section 510 may be indicative of resources that are in use by the guest associated with VMDBK 504-2. The invalid section 512 may be indicative of resources that are currently allocated to but ultimately may be taken from, or de-allocated from, the guest associated with VMDBK 504-2.

Referring back to FIG. 4, in block 404 a list of counts may be obtained or maintained. For example, as part of block 404, one or more of the following counts may be obtained: (1) a count of invalidations for each guest, (2) a count of revalidations for each guest, (3) a global count of invalidations across a system environment, (4) a global count of revalidations across the system environment, (5) a historical invalidation rate for each guest, (6) a historical revalidation rate for each guest, (7) a global historical invalidation rate across the system environment, and (8) a global historical revalidation rate across the system environment. The counts may pertain to resources and may be specified in terms of one or more units, such as a page or a frame. The counts of block 404 may be obtained based on the visitation to each guest in block 402.

In block 406, a target size for the invalid section (e.g., invalid section 512) of each guest's UFO list (e.g., UFO list 508) may be (re)calculated. In particular, the calculation of block 406 may adhere to a formula #1, given by:

$$\text{new\_target\_size} = \text{old\_target\_size} * [\,(\text{global\_historical\_revalidation\_rate} / \text{global\_historical\_invalidation\_rate}) / (\text{guest\_historical\_revalidation\_rate} / \text{guest\_historical\_invalidation\_rate}),$$

where new_target_size may correspond to a target size for the guest, old_target_size may correspond to a target size for the guest during a previous iteration or execution of the method 400, global_historical_revalidation_rate may correspond to a historical revalidation rate for all the guests in a given system environment, global_historical_invalidation_rate may correspond to a historical invalidation rate for all the guests in the given system environment, guest_historical_revalidation_rate may correspond to a historical revalidation rate for a particular guest under consideration, and guest_historical_invalidation_rate may correspond to a historical invalidation rate for the particular guest under consideration. In some embodiments, one or more historical rates are used to smooth erratic behavior and/or to emphasize recent data relative to older data.

If a first guest is revalidating resources at a higher rate than other guests, then the first guest and the system environment may run/execute smoother if less resources are de-allocated from the first guest. Under such a scenario, and in accordance with the above formula #1, the old_target_size will be multiplied by a number less than one, thereby lowering the target size of the invalid section of the first guest's UFO list. In effect, this will let the first guest keep more of its own resources and the algorithm may de-allocate relatively more resources from other guests.

If a first guest is revalidating few resources compared to other guests, then the first guest may be a good candidate from which to de-allocate resources. Under such a scenario, and in accordance with the above formula #1, the old_target_size will be multiplied by a number greater than one, thereby increasing the target size of the invalid section of the first guest's UFO list. In effect, this will have a tendency to de-allocate more resources from the first guest relative to the other guests.

The method 400 is illustrative. In some embodiments, one or more operations or blocks (or a portion thereof) may be optional. In some embodiments, one or more blocks may execute in an order or sequence different from what is shown in FIG. 4. In some embodiments, one or more additional blocks not shown may be included.

As described above, in some embodiments an individual guest's target size may be based on page revalidation and invalidation ratios with respect to system-wide or environment-wide page revalidation and invalidation ratios. As a result, guest target sizes, which are relative to system rates, may be relative to one another indirectly. Guest activity level may serve as an input to one or more calculations. Guest "working set" size may become an output of an algorithm, as opposed to an input of the algorithm. A level of demand on the overall system may be factored in.

Technical effects and benefits include an adaptive algorithm for allocating or de-allocating resources amongst guests in a system environment. A determination for allocating or de-allocating resources may be made on a relative basis. For example, a "busy" guest on an "even busier" system may be a good candidate from which to de-allocate resources.

Adjustments in terms of resource allocation may be made based on relative revalidation-to-invalidation ratios (e.g., a ratio of ratios).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for determining a resource allocation, comprising:
   visiting, by a computing device comprising a processor, each guest of a plurality of guests;
   obtaining, by the computing device, a list of invalidation counts and revalidation counts associated with resources based on the visiting each guest;
   calculating, by the computing device, a first ratio based on a global historical revalidation rate of resources associated with all of the plurality of guests and a global historical invalidation rate of resources associated with all of the plurality of guests;
   calculating, by the computing device, for each guest a second ratio based on a historical revalidation rate of resources associated with the guest and a historical invalidation rate of resources associated with the guest;
   calculating, by the computing device, for each guest a third ratio as a ratio of the first ratio and the second ratio;
   calculating, by the computing device, a target size for invalidating resources for each guest based on the third ratio; and
   adjusting an allocation of a resource to a guest based on at least one of the target sizes.

2. The method of claim 1, wherein the resources comprise at least one of a page and a frame.

3. The method of claim 1, wherein the visiting of each guest of the plurality of guests occurs in a round robin manner.

4. The method of claim 1, wherein the invalidation counts comprise an invalidation count of resources associated with each guest and a global invalidation coup of resources associated with all of the plurality of guests, and wherein the revalidation counts comprise a revalidation count of resources associated with each guest and a global revalidation count of resources associated with all of the plurality of guests.

5. The method of claim 4, wherein historical rates are based on the invalidation count of resources associated with each guest, the global invalidation count of resources, the revalidation count of resources associated with each guest, and the global revalidation count of resources, the calculating further based on the historical rates.

6. The method of claim 1
   wherein the calculating the target size comprises multiplying an old target size and the third ratio.

7. An apparatus comprising:
   at least one processing device; and
   a storage device having instructions stored thereon that, when executed by the at least one processing device, cause the apparatus to:
   visit each guest of a plurality of guests,
   obtain a list of invalidation counts and revalidation counts associated with resources based on visiting each guest,
   calculate a first ratio based on a global historical revalidation rate of resources associated with all of the plurality of guests and a global historical invalidation rate of resources associated with all of the plurality of guests;
   calculate, for each guest a second ratio based on a historical revalidation rate of resources associated with the guest and a historical invalidation rate of resources associated with the guest;
   calculate, for each guest, a third ratio as a ratio of the first ratio and the second ratio; and
   calculate a target size for invalidating resources for each guest based on the third ratio; and
   adjusting an allocation of a resource to a guest based on at least one of the target size.

8. The apparatus of claim 7, wherein the resources comprise at least one of a page and a frame.

9. The apparatus of claim 7, wherein the instructions, when executed by the at least one processing device, cause the apparatus to:
   visit each guest of the plurality of guests in a round robin manner by accessing a virtual machine definition block for the guest included in a global cyclic list.

10. The apparatus of claim 9, wherein the virtual machine definition block for the guest comprises a pointer to a linked list of data structures that represent one or more resources allocated to the guest, and wherein the linked list comprises a first section of active resources for the guest, and wherein the linked list comprises a second section of resources that are configured to be de-allocated from the guest.

11. The apparatus of claim 7, wherein the invalidation counts comprise an invalidation count of resources associated with each guest and a global invalidation count of resources associated with all of the plurality of guests, and wherein the revalidation counts comprise a revalidation count of resources associated with each guest and a global revalidation count of resources associated with all of the plurality of guests.

12. The apparatus of claim 11, wherein historical rates are based on the invalidation count of resources associated with each guest, the global invalidation count of resources, the revalidation count of resources associated with each guest, and the global revalidation count of resources, wherein the calculation of the target size is based on the historical rates.

13. The apparatus of claim 7
   wherein the calculating the target size comprises multiplying an old target size and the third ratio.

14. A computer program product comprising:
   a non-transitory computer readable storage medium having computer readable program code embodied therewith, the computer readable program code comprising:
   computer readable program code configured for:
      visiting each guest of a plurality of guests;
      obtaining a list of invalidation counts and revalidation counts associated with resources based on visiting each guest;
      calculating a first ratio based on a global historical revalidation rate of resources associated with all of the plurality of guests and a global historical invalidation rate of resources associated with all of the plurality of guests;
      calculating for each guest a second ratio based on a historical revalidation rate of resources associated with the guest and a historical invalidation rate of resources associated with the guest;
      calculating for each guest a third ratio as a ratio of the first ratio and the second ratio;

calculating a target size for invalidating resources for each guest based on the third ratio; and adjusting an allocation of a resource to a guest based on at least one of the target sizes.

15. The computer program product of claim 14, wherein the invalidation counts comprise an invalidation count of resources associated with each guest and a global invalidation count of resources associated with all of the plurality of guests, and wherein the revalidation counts comprise a revalidation count of resources associated with each guest and a global revalidation count of resources associated with all of the plurality of guests.

16. The computer program product of claim 15, wherein historical rates are based on the invalidation count of resources associated with each guest, the global invalidation count of resources, the revalidation count of resources associated with each guest, and the global revalidation count of resources are based on historical rates, the calculating further based on the historical rates.

17. The computer program product of claim 14 wherein the calculating the target size comprises multiplying an old target size and the third ratio.

* * * * *